United States Patent
Huebschman

(10) Patent No.: US 7,928,901 B2
(45) Date of Patent: Apr. 19, 2011

(54) SYSTEMS AND METHODS FOR PRODUCING RADAR IMAGES

(75) Inventor: Benjamin D. Huebschman, Beltsville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 189 days.

(21) Appl. No.: 12/252,736

(22) Filed: Oct. 16, 2008

(65) Prior Publication Data

US 2010/0097265 A1 Apr. 22, 2010

(51) Int. Cl.
*G01S 13/90* (2006.01)

(52) U.S. Cl. .................................. 342/179; 342/25 F

(58) Field of Classification Search ............ 342/179
See application file for complete search history.

(56) References Cited

U.S. PATENT DOCUMENTS

| | | | |
|---|---|---|---|
| 3,011,166 A | 11/1961 | Fell et al. | |
| 4,067,009 A | 1/1978 | Constant | |
| 4,164,740 A | 8/1979 | Constant | |
| 4,280,127 A | 7/1981 | Lee et al. | |
| 4,517,569 A * | 5/1985 | Gerharz | 342/6 |
| 4,553,144 A | 11/1985 | Houdard et al. | |
| 4,616,227 A | 10/1986 | Homma et al. | |
| 4,638,315 A * | 1/1987 | Raven | 342/25 F |
| 4,827,263 A | 5/1989 | Jones et al. | |
| 4,830,479 A * | 5/1989 | Lammers et al. | 359/223.1 |
| 4,929,950 A | 5/1990 | Freeman et al. | |
| 4,963,877 A | 10/1990 | Wood et al. | |
| 5,007,721 A | 4/1991 | Morris et al. | |
| 5,017,922 A * | 5/1991 | Klausing et al. | 342/25 F |
| 5,184,133 A | 2/1993 | Tsao | |
| 5,264,971 A * | 11/1993 | Lammers et al. | 360/63 |
| 5,451,957 A * | 9/1995 | Klausing | 342/25 F |
| 5,608,404 A | 3/1997 | Burns et al. | |
| 5,614,907 A * | 3/1997 | Kreitmair-Steck et al. | 342/25 F |
| 5,670,960 A * | 9/1997 | Cessat | 342/25 A |
| 5,777,573 A * | 7/1998 | Klausing et al. | 342/25 F |
| 5,926,125 A | 7/1999 | Wood | |
| 6,150,972 A | 11/2000 | Bickel et al. | |
| 6,222,933 B1 | 4/2001 | Mittermayer et al. | |
| 6,388,606 B1 | 5/2002 | Keydel et al. | |
| 6,429,804 B1 | 8/2002 | Kishida et al. | |
| 6,441,772 B1 | 8/2002 | Hellsten et al. | |
| 6,515,613 B2 * | 2/2003 | Klausing et al. | 342/25 R |
| 6,563,451 B1 | 5/2003 | Krikorian et al. | |
| 6,603,423 B2 * | 8/2003 | Klausing et al. | 342/25 R |
| 6,750,809 B1 | 6/2004 | Cho et al. | |
| 6,795,031 B1 * | 9/2004 | Walker et al. | 343/713 |
| 6,875,978 B2 * | 4/2005 | Halmos | 250/227.11 |
| 6,911,950 B2 * | 6/2005 | Harron | 343/766 |
| 7,187,334 B2 * | 3/2007 | Franson et al. | 343/713 |
| 2007/0024489 A1* | 2/2007 | Cerwin | 342/22 |
| 2010/0033389 A1* | 2/2010 | Yonak et al. | 343/755 |

* cited by examiner

*Primary Examiner* — Thomas H Tarcza
*Assistant Examiner* — Matthew M Barker
(74) *Attorney, Agent, or Firm* — Christos S. Kyriakou; Alan I. Kalb

(57) ABSTRACT

Systems and methods for producing radar images are provided. In illustrated embodiments, a representative system includes: a transmitter operative to transmit a pulsed signal; a receiver operative to sample the pulsed signal after reflection; a Doppler-shifting mechanism operative to create a Doppler shift in the pulsed signal; and a platform upon which the transmitter and the Doppler-shifting mechanism are mounted, the Doppler shift being associated with relative motion between the Doppler-shifting mechanism and the platform.

6 Claims, 6 Drawing Sheets

ANALOG SIGNAL

DFT $v = 2\pi r \omega$ $\Theta$

SYSTEMS AND METHODS FOR PRODUCING RADAR IMAGES

GOVERNMENT INTEREST

The invention described herein may be manufactured, used, and licensed by or for the United States Government.

BACKGROUND

1. Technical Field

The disclosure generally relates to radar systems.

2. Description of the Related Art

Synthetic Aperture Radar (SAR) is a system for producing high-quality radar images with wide applications in remote sensing and mapping. SAR is used for such diverse functions as military imagery, oil and mineral surveys, and mapping the surfaces of planets. Modern SAR systems use the Doppler shift generated by the motion of a platform upon which the radar system is mounted, such as an airplane or a satellite, which sweeps the radar antenna over the terrain to be imaged to resolve objects in azimuth.

Ground-based SAR systems use image reconstruction algorithms based on position. These systems typically require that the antenna be displaced in relation to the object that is being imaged in order to produce enough sampling locations to reconstruct an image. Such ground-based SAR systems tend to exhibit various disadvantages, such as only being able to operate by moving the antenna in a wide sweep over a relatively immobile target.

SUMMARY

Systems and methods for producing radar images are provided. In this regard, an exemplary embodiment of a system comprises: a transmitter operative to transmit a pulsed signal; a receiver operative to sample the pulsed signal after reflection; a Doppler-shifting mechanism operative to create a Doppler shift in the pulsed signal; and a platform upon which the transmitter and the Doppler-shifting mechanism are mounted, the Doppler shift being associated with relative motion between the Doppler-shifting mechanism and the platform.

An exemplary embodiment of a method comprises: transmitting a Doppler-shifted pulse; receiving the Doppler-shifted pulse as a reflection from a target; analyzing the pulse received to generate a plurality of samples; and correlating frequency responses of the plurality of samples with points on the target.

Another exemplary embodiment of a method comprises: transmitting a Doppler-shifted pulse; receiving the Doppler-shifted pulse as a terrain reflection; analyzing the pulse received to generate a plurality of samples; correlating the samples with range bins based on times received; determining the frequency spectrum of for samples within the range bins; and correlating the frequency spectra and the range bins with points on the terrain to produce an image of the terrain.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure. For functionality, the mechanism for inducing the Doppler shift can be located on either the transmitting antenna, the receiving antenna, or both as would be the case if the antenna was used for transmission and reception.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for producing radar images are provided, several exemplary embodiments of which will be described in detail. In this regard, such systems and methods involve the use of Doppler-shifting mechanisms. In some embodiments, a high degree of resolution may be achieved as relative motion to produce a Doppler shift does not rely on motion of the transmitter and/or receiver in a macro sense with respect to the target. That is, in such an embodiment, relative motion to produce a Doppler shift for enabling imaging can be isolated to the transmitter and/or receiver.

Figure 1:
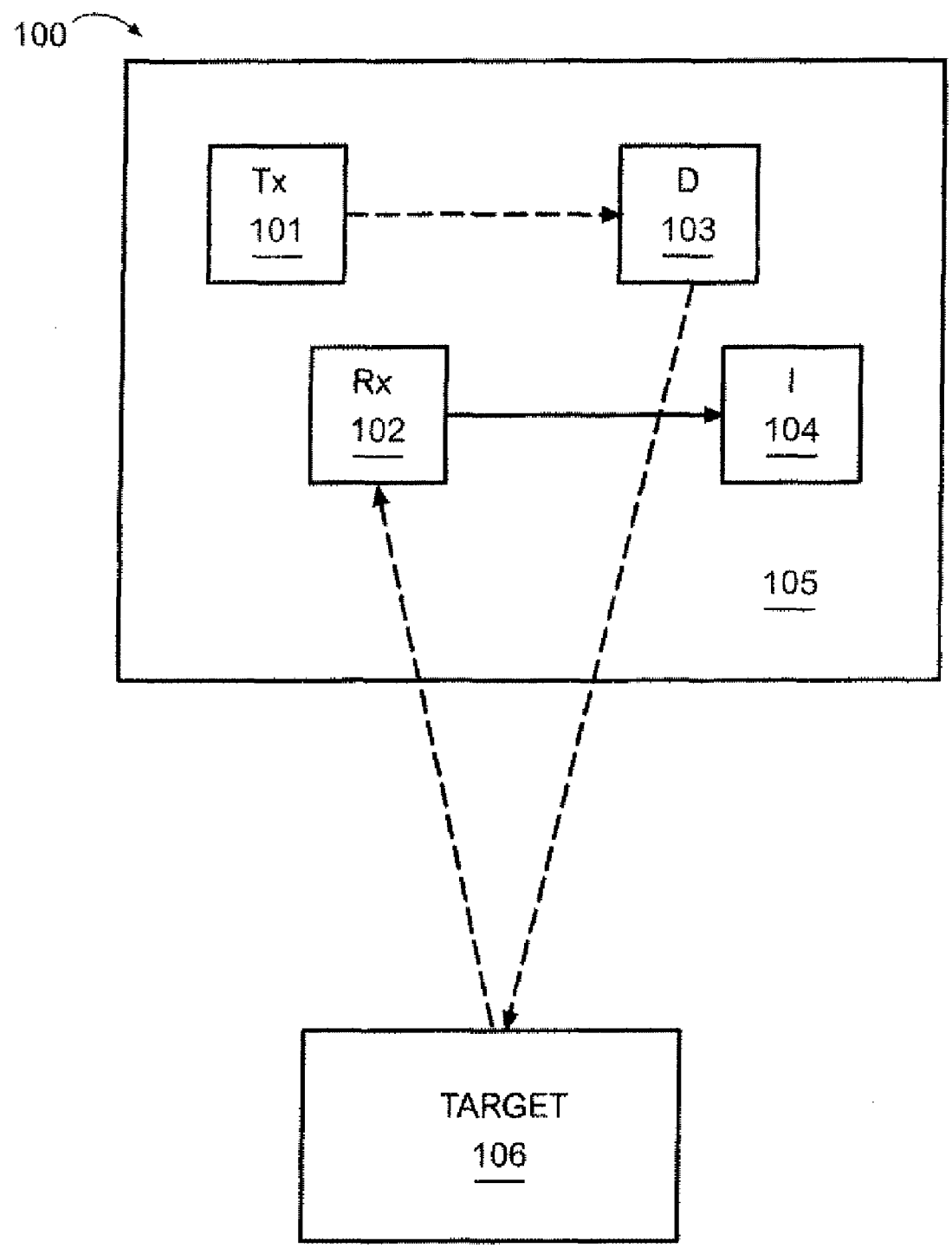
FIG. 1 is a functional block diagram of an embodiment of a radar system.

FIG. 1 is a schematic diagram depicting an exemplary embodiment of a system for producing radar images. As shown in FIG. 1, system 100 includes a transmitter 101, a receiver 102, a Doppler-shifting mechanism 103 and an imaging unit 104. In this embodiment, the transmitter, the receiver, the Doppler-shifting mechanism and the imaging unit are mounted on a platform 105.

In operation, such as for the purpose of imaging a target 106, a pulsed signal is transmitted from the transmitter with a Doppler shift being imparted to the pulsed signal by the Doppler-shifting mechanism. In this embodiment, the Doppler shift is created by relative motion between the Doppler-shifting mechanism and the platform. Thus, the pulsed signal contains velocity information in the form of the Doppler shift. Notably, in some embodiments, the platform may also exhibit relative motion with respect to the target, such as those instances in which the platform is carried by a vehicle.

The pulsed signal reflects back from the target and is sampled at the receiver. Notably, multiple samples corresponding to the reflected pulsed signal can be acquired, with multiple ones of the samples containing different range information pertaining to the target. This is particularly the case when the antenna beam is broad and the pulse is capable of illuminating the entire target that is being imaged. These samples are then passed to the imaging unit for further processing as will be described later.

It should be noted that the embodiment of FIG. 1 uses a separate transmitter and a separate receiver, in contrast to a transceiver, which can be used in other embodiments. The use of a separate transmitter and a separate receiver may be considered advantageous in some implementations.

Figure 2A:
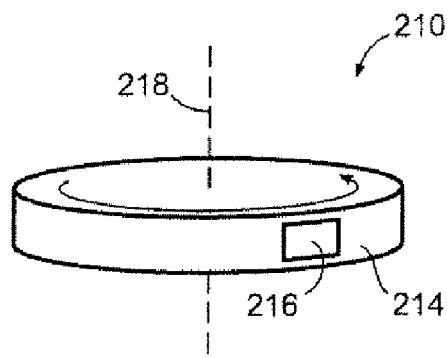
FIG. 2A is schematic diagram depicting an exemplary embodiment of a Doppler-shifting mechanism configured as a rotating transceiver module.

FIGS. 2A-2D are schematic diagrams depicting exemplary embodiments of Doppler-shifting mechanisms. In this regard, FIG. 2A depicts a rotating transceiver module 210 configured to generate a Doppler shift. The module rotates about an axis 218, and the pulse is transmitted from a transmitting surface 216 on an edge of a structure 214. In this embodiment, structure 214 is configured as a disk.

Figure 2B:
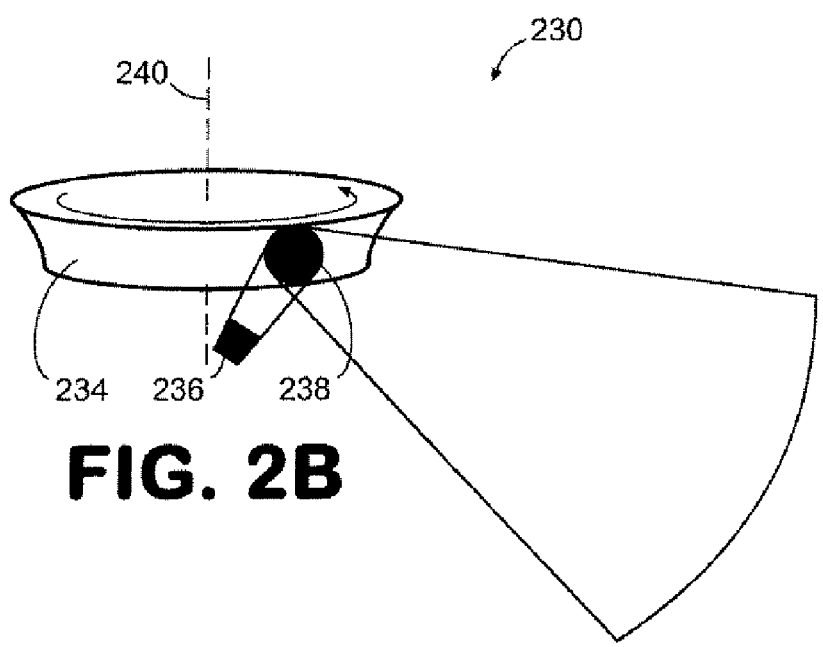
FIG. 2B is schematic diagram depicting an exemplary embodiment of a Doppler-shifting mechanism configured as a rotating concave reflector.
Figure 2C:
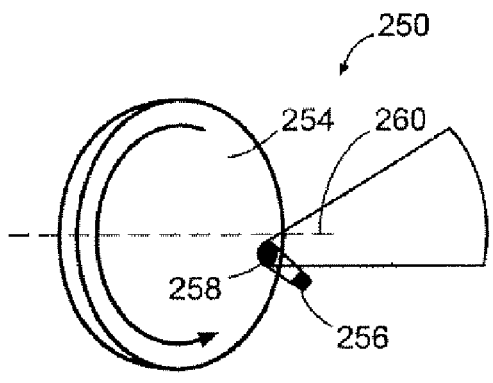
FIG. 2C is schematic diagram depicting an exemplary embodiment of a Doppler-shifting mechanism configured as a rotating dish.

In FIGS. 2B and 2C, embodiments that incorporate rotating reflectors are depicted. Notably, rotating reflectors reflect signals in the inertial reference frame of the portion of the reflecting surface that is illuminated by the transmitter. In this regard, a rotating reflector 230 of FIG. 2B rotates about an axis 240. A transmitter/receiver horn antenna 236 transmits a beam towards a concave reflecting surface 234, thereby illuminating a location 238. The concave reflecting surface 234 shapes the beam in the direction perpendicular to the tangential radial velocity of rotating reflector 230 upon reflection.

In contrast, the partially illuminated dish antenna 250 of FIG. 2C rotates about an axis 260 to produce a Doppler shift. Specifically, a transceiver horn antenna 256 transmits a beam onto a concave reflecting surface 254, thereby illuminating a location 258. Location 258 reflects and shapes the beam in a direction perpendicular to the tangential radial velocity of dish antenna 250.

The transmitter motion that is perpendicular to the direction of propagation determines the amount of Doppler shift and, by extension, the resolution of the radar. For the foregoing embodiments, illustrated in FIGS. 2A, 2B, and 2C, that include a rotating structure, the motion that is normal to the direction of propagation is the tangential motion of the rotating structure and is a product of the angular velocity and the radius of the structure.

Figure 2D:
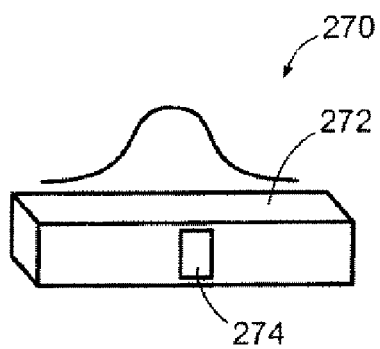
FIG. 2D is schematic diagram depicting an exemplary embodiment of a Doppler-shifting mechanism configured as a vibrating transmitter.

In FIG. 2D, an embodiment of a mechanism 270 incorporating a vibrating structure 272 is depicted. Transmitter antenna 274 is mounted on the vibrating structure. The emitted pulses may be timed to coincide with peaks in the vibration of the structure. The receiver may be mounted on a separated, non-vibrating structure in order to continually sample the returns. This embodiment could potentially greatly reduce the size of the system, as a velocity component that is dependent on the size of the structure is not utilized.

Figure 3:
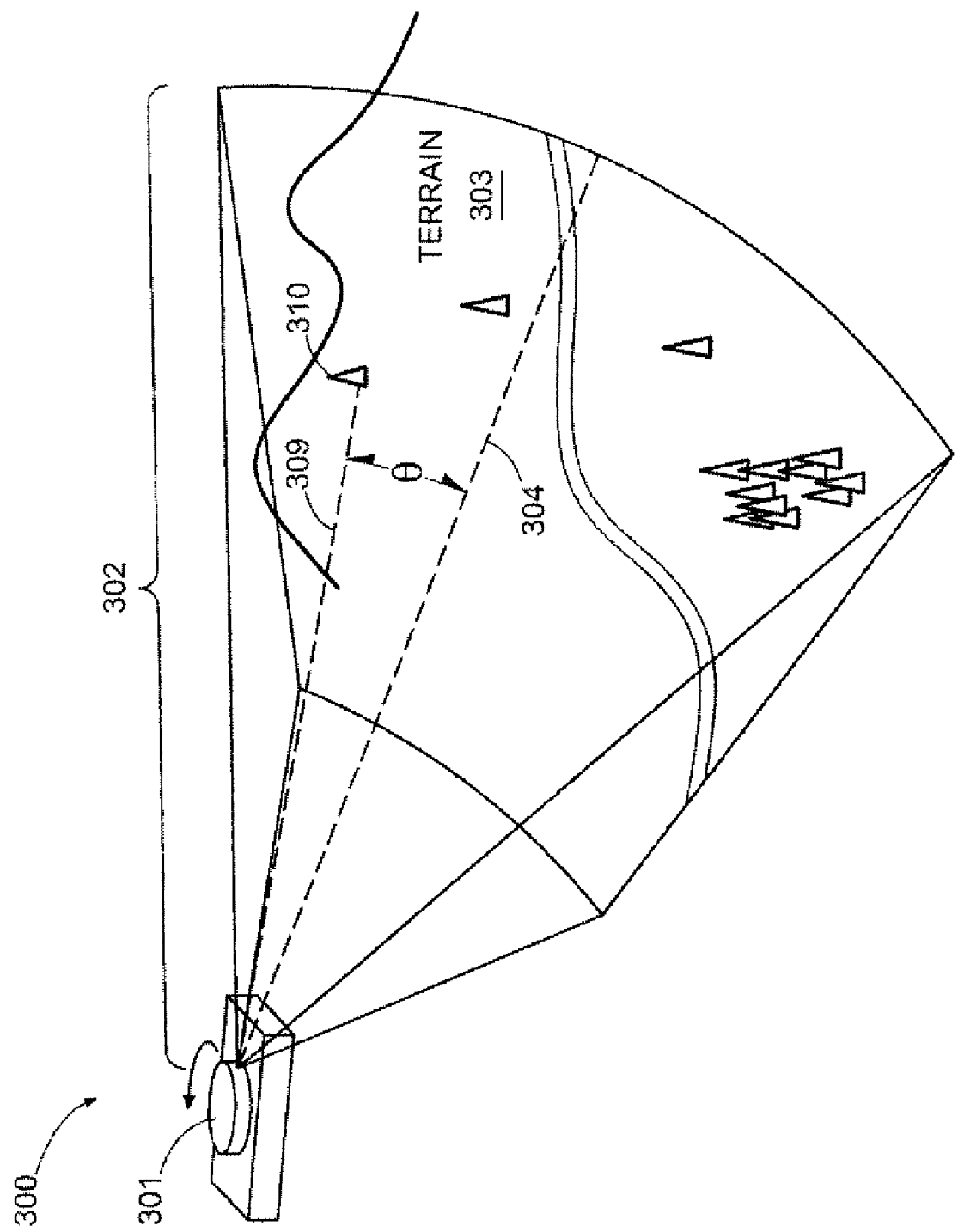
FIG. 3 is a high-level diagram showing the operation of an embodiment of a radar system.

FIG. 3 is a schematic diagram depicting the operation of an embodiment of a system 300. Notably, system 300 of FIG. 3 incorporates a Doppler-shifting mechanism 301 that in this illustrated embodiment rotates counter-clockwise. Alternatively, the Doppler-shifting mechanism 301 can rotate clockwise. As shown in FIG. 3, a Doppler-shifted pulsed signal 302 is transmitted that illuminates a target. In this illustrated example, the target is a sector of terrain 303. Frequency differences are produced by the velocity component that is inserted in the pulse by the Doppler shift. The shift is related to an angle θ between the zero line 304 and a line 309 from the transmitter to the point on the terrain 303. By way of example, line 309 extends from the transmitter to a location 310 (e.g., a tree). Each frequency difference may be correlated with a respective angle θ. With reference to the direction of motion of the inertial reference frame of the mechanism that produces the Doppler shift, points in front of the zero line 304 are shifted up in frequency, and points behind the zero line 304 are shifted down in frequency. Thus, location 310 is associated with an up-shifted frequency.

Figure 4:
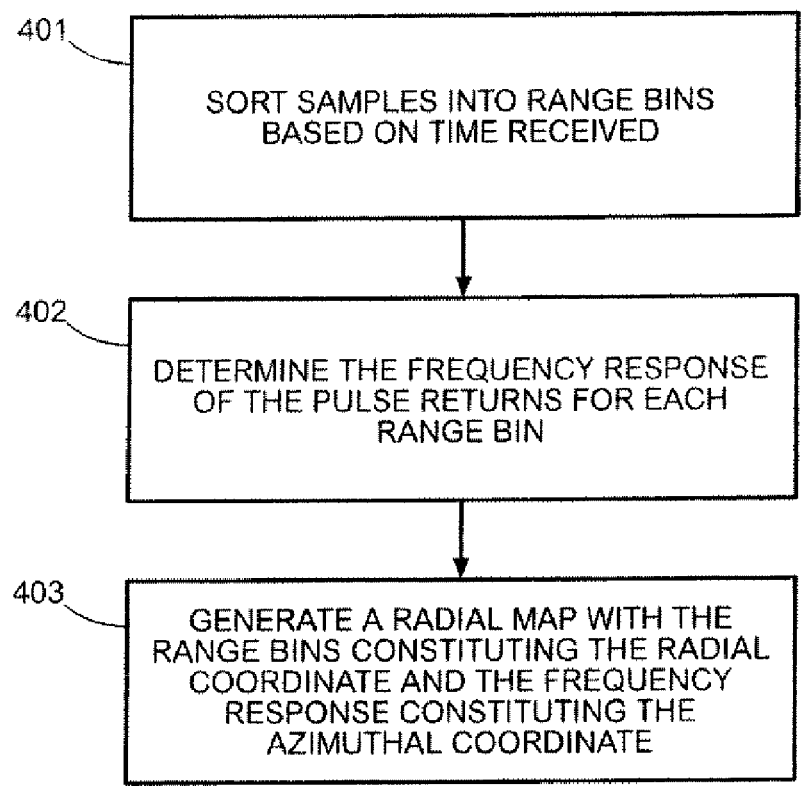
FIG. 4 is a flowchart depicting the functionality of an embodiment of a radar system.

FIG. 4 is a flowchart of the functionality or a method associated with an embodiment of a system for producing radar images. In particular, FIG. 4 depicts representative processing steps that may be implemented responsive to receiving a reflected pulsed signal.

As shown in FIG. 4, samples corresponding to a reflected pulsed signal are associated with range bins, which are sorted based on the time received, in block 401. Each range bin corresponds to a different respective distance from the receiver. The frequency spectrum of responses in each range bin is determined in block 402. By arranging these frequency responses in a radial map in block 403, an image of the target is produced. The range bin gives the radial coordinate of the sample, and the frequency response gives the azimuthal coordinate. This radial map can then be converted into a grid map by interpolation if this is desired by the user.

Figure 5:
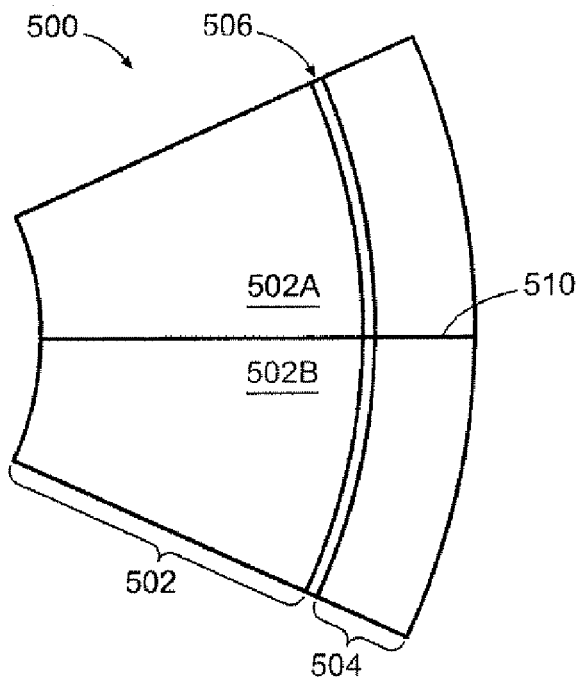
FIG. 5 is a visual representation of an embodiment of a range bin.

FIG. 5 shows a visual representation of a range bin 506 in an illuminated target area 500. Each range bin 506 is a respective distance 502 from the transmitter. The distance from the range bin 506 to the maximum range is given by the distance 504. The range bin is bisected by the zero line 510; points in area 502b are shifted down in frequency, and points in area 502a are shifted up in frequency.

Figure 6A:
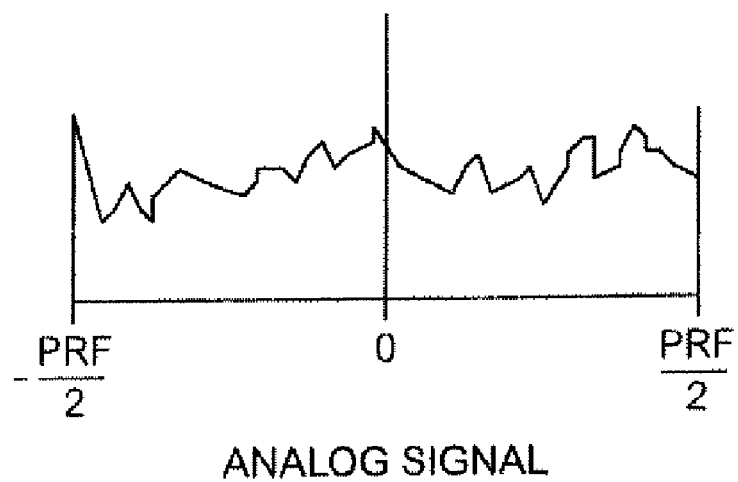
FIG. 6A shows the analog spectrum of a signal.
Figure 6B:
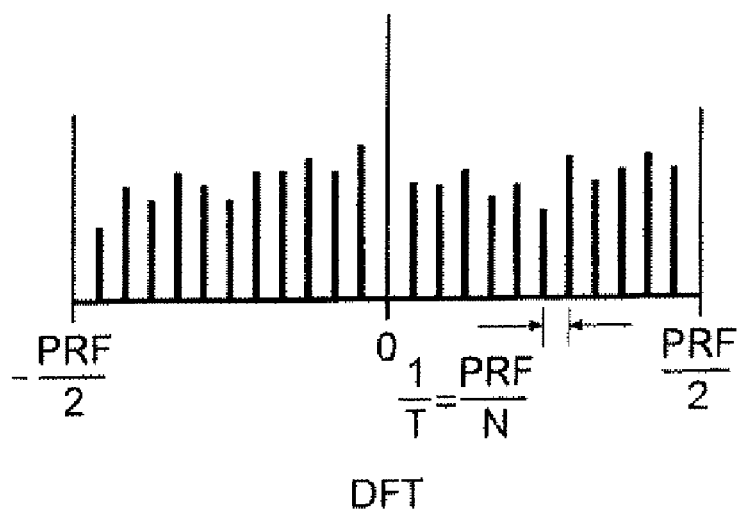
FIG. 6B shows the discrete Fourier transform spectra of the signal of FIG. 6A.

There are various computational algorithms that can determine the frequency response of reflected pulsed signals. By way of example, a discrete Fourier transform (DFT) can be used. In this regard, an analog signal frequency spectrum and the corresponding DFT are shown in FIG. 6A and FIG. 6B, respectively. The frequency of the transmitted pulse along the zero line is the frequency of the transmitted pulse, and the Doppler shifting mechanism applies no change in frequency along the zero line. Of note is the fact that the resolution is a function of the dwell time, which could be arbitrary in some embodiments. Other algorithms may also be used.

Figure 7A:
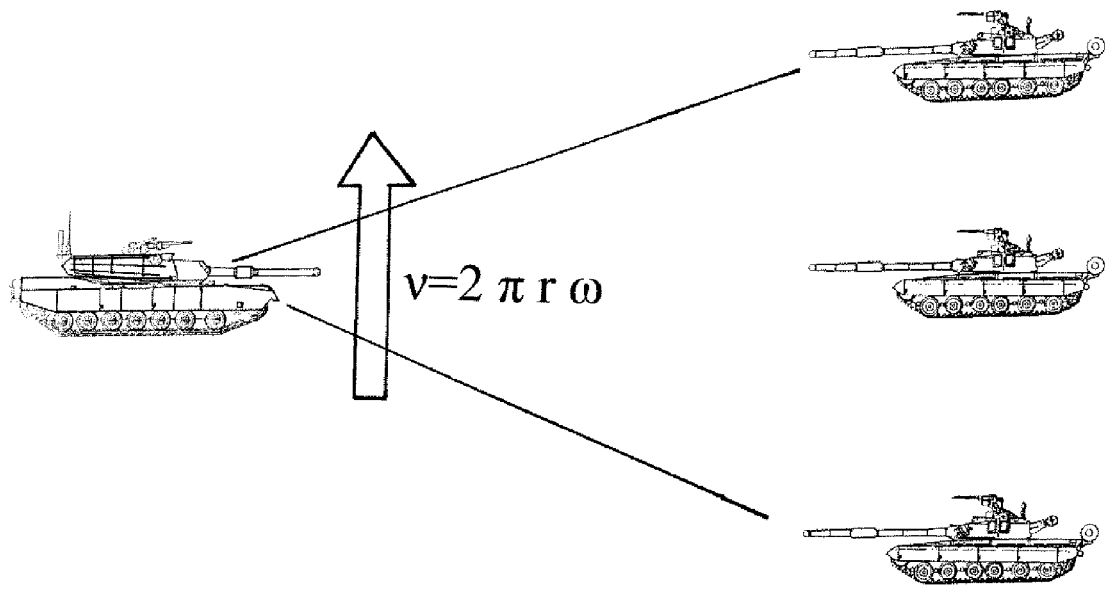
FIG. 7a depicts the inertial reference plane of the radar pulse.
Figure 7B:
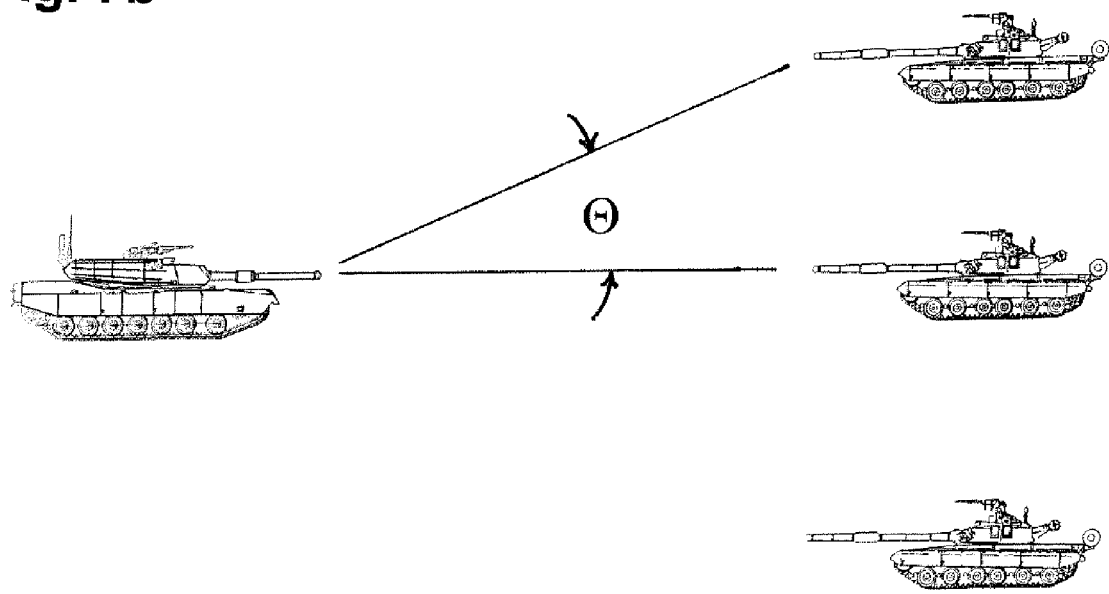
FIG. 7b depicts the definition of the angular relationship.

Operation and resolution are explained in greater detail below, with reference to various mathematical equations and examples corresponding to a representative system. System operation begins when a pulse that has been Doppler shifted by some mechanism, for example one of the rotating mechanisms illustrated in FIGS. 2A-2C or a vibrating mechanism similar to the mechanism illustrated in FIG. 2D, is transmitted from an antenna. The pulse now has a velocity component in the inertial reference frame of the surface of the Doppler shifting mechanism, perpendicular to the direction of radar propagation. The pulse propagates to the target. The pulse reflects from the terrain being imaged. The pulse propagates to the receiver. The pulse is sampled at the receiver and passed into range bins based on the time received. Range bins with the same range are correlated between pulses to determine the frequency response of the range bin. There is a change in frequency of the reflected signal due to a Doppler shift, which is given in equation (1).

$$\Delta f = \frac{v}{\lambda} \tag{1}$$

Where v is the relative velocity of the Doppler shifting mechanism and lambda is the wavelength of the transmitted pulse. The equation neglects the effects of relativity which are not relevant at the speeds of the embodiments described below. The relation between angle and radial velocity is given in equation (2), with θ defined in FIG. 7b.

$$v_R = v \sin(\theta) \tag{2}$$

Combining equations (1) and (2) we determine that $$\Delta f = \frac{v\sin(\theta)}{\lambda} \qquad (3)$$

Frequency differences are produced by differing Doppler shifts. These shifts are based on the angle between the zero line and a line from the transmitter to the point on the ground. Because of this, each frequency can be correlated with a point on the ground. Points in front of the zero line will be shifted up in frequency; points behind the zero line will be shifted down in frequency. For points near the zero line, the change in frequency can be approximated with $$\Delta f = \frac{v}{\lambda}\theta \qquad (4)$$

solving for theta:

$$\theta = \frac{\lambda}{v}\Delta f \qquad (5)$$

This provides a basis for determining the resolution of the system. The resolution of a radar system is a function of a number of parameters. Like conventional radars, range resolution is a function of pulse width. For an unchirped pulse, the range resolution cannot be less than half of the pulse duration and still avoid ambiguity regarding the source of the reflected pulse. Range resolution is given by:

$$R_R = \frac{c\tau}{2} \qquad (6)$$

In this equation, c is the speed of light, and tau is the duration of the pulse. Unlike conventional radars, cross range resolution is not a function of the antenna aperture, but rather is a function of the duration of sampling. From equation (5), $$R_{CR} = \frac{\lambda}{v}\Delta fr \qquad (7)$$

where r is the range from the emitter to the target. As shown in FIG. 6b, the limit of the discrimination between frequencies is a function of the dwell time, which is the duration of the returned pulses that are sampled and processed. Replacing $\Delta f$ with this value:

$$R_{CR} = \frac{\lambda}{v}\frac{1}{T}r \qquad (8)$$

For this equation T is the duration of the sampling.

Three additional embodiments will now be described in detail: a 20 GHz K band mine detection radar, a 35 GHz Ka band surveillance radar, and a less expensive persistent surveillance radar operating at 2.5 GHz.

The function of the mine detection radar is to detect land mines with a difference in dielectric from that of the surrounding soil. Due to the relatively high frequency, the radar will only be able to detect mines at or near the surface, but that is a mine's typical location during deployment. The radar would be more useful in dry soil than in moist soil. The radar's maximum range should be less than 200 m. A resolution of about 3 inches or 7.5 cm should be sufficient to determine the basic type of mine and discriminate between mines and rocks. Typically for an image to be interpreted by a human analyst the range resolution should be close to the cross range resolution to avoid a synthetic distortion. Using equation (6) and solving for pulse duration:

$$\tau = \frac{2R_R}{c} \qquad (9)$$

For $R_R$ of 7.5 cm, $\tau$ should be 0.5 nanoseconds. For a similar cross range resolution, the ability to discriminate between frequencies is:

$$\Delta f = \frac{v}{r\lambda}R_{CR} \qquad (10)$$

For all of these examples it is assumed that the Doppler shift will be derived from a rotating structure. The rotating structure will have a diameter of 10 cm and rotate at 7200 rpm, which is typical of a commercial hard drive. The Doppler velocity is the product of twice the radius, pi, and the rotations per second. Using equation (11), the calculated Doppler velocity is 37.7 m/s.

$$v = 2\pi rps \cdot radius \qquad (11)$$

This leads to a $\Delta f$ of approximately 1 Hz at a range of 200 m. Which using equation (12) would require a dwell time of about one second.

$$T = \frac{\lambda}{v}\frac{1}{R_{CR}}r \qquad (12)$$

The same method may be used to determine the parameters for a surveillance radar operating at a frequency of 35 GHz. To detect and identify personnel and vehicles, a resolution of a quarter of a meter may be desired. To achieve this resolution, a pulse of the duration given by equation (13) can be used:

$$\tau = \frac{2R_R}{c} = \frac{2 \times 0.25 \text{ m}}{3 \times 10^8 \text{ m/s}} = 1.7 \text{ nS} \qquad (13)$$

To resolve objects 4 km away, $\Delta f$ is given by $$\Delta f = \frac{v}{r\lambda}R_{CR} = \frac{37.7 \text{ m/s}}{4000 \text{ m} \times 0.0086 \text{ m}}0.25 \text{ m} = 0.2740 \text{ Hz}, \qquad (14)$$

leading to $$T = \frac{\lambda}{v}\frac{1}{R_{CR}}r = \frac{4000 \text{ m} \times 0.0086 \text{ m}}{37.7 \text{ m/s} \times 0.25 \text{ m}} = 3.65 \text{ s}. \qquad (15)$$

The persistent surveillance system at 2.5 GHz should have a resolution of one meter and should be able to look out to 300 m. This yields a pulse length of $$\tau = \frac{2R_R}{c} = \frac{2 \times 1 \text{ m}}{3 \times 10^8 \text{ m/s}} = 6.7 \text{ nS} \quad (16)$$

with a dwell time of $$T = \frac{\lambda}{v} \frac{1}{R_{CR}} r = \frac{300 \text{ m} \times 0.12 \text{ m}}{37.7 \text{ m/s} \times 1 \text{ m}} = 0.95 \text{ s.} \quad (17)$$

The resolution would not be too high for a system like this, but it would be more than capable of detecting a person or a vehicle. It could also be used in change detection.

The foregoing embodiments may also be implemented with a vibrating transmitter; the basic principles of operation may be the same. The upper limit on the velocity used for inducing the Doppler shift in a vibrating structure is higher for the vibrating structure than the rotating structure.

The various embodiments of the system, such as these described herein, have many practical applications. The radar may be mounted on a platform that is either portable or stationary, allowing for great flexibility of use. In contrast to scanning radar with high directivity, which use complex phase shifters and multi-emitting elements, some embodiments may use a broad beam with a single transmitter and receiver, making it simpler and less expensive. Since accuracy for Doppler systems is a function of frequency resolution, and frequency resolution is a function of sampling time, some embodiments could in theory provide arbitrarily fine azimuth resolution; this will probably end up being only limited by noise. Multi-axis image generation may be possible because the Doppler shift is being created as opposed to being a by-product of the platform's motion. Certain embodiments may function without light, or to see through smoke, fog, light vegetation, or some walls. Suggested applications may include, but are not limited to, machine vision, target acquisition, targeting, persistent surveillance, mine detection, reconnaissance, and support for urban operations. Other suggested applications may include, but are not limited to, support to fire fighters, machine vision, security systems, as well as locating survivors in collapsed structures. If an embodiment were to operate at a frequency that penetrates water, the system could also be used for medical imagery.

Various functionality, such as that described above in the flowcharts and/or the functionality described with respect to computational algorithms, can be implemented in hardware and/or software. In this regard, a computing device can be used to implement various functionality, such as the imaging unit of FIG. 1, element 4.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, an application specific integrated circuit (ASIC), a specially programmed field programmable gate array (FPGA), a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, ARAM and so forth)) and/or nonvolatile memory elements (e.g., ROM, hard drive, tape, CD-ROM and so forth). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device and so forth. Further, the Input/Output devices may also include output devices, for example but not limited to, a printer, display and so forth. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router and so forth.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a step, a module, a segment, and/or a portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A system for producing radar images, comprising:
a transmitter operative to transmit a pulsed signal;
a receiver operative to sample the pulsed signal after reflection;
a Doppler-shifting mechanism operative to create a Doppler shift in the pulsed signal;
a platform upon which the transmitter and the Doppler-shifting mechanism are mounted, the Doppler shift being associated with relative motion between the Doppler-shifting mechanism and the platform,
further comprising an imaging unit operative to receive information corresponding to a plurality of samples from the receiver, determine respective frequency responses for the plurality of samples, and correlate the frequency responses into points on an illuminated target in order to produce an image,
wherein the platform is stationary during transmission of the pulsed signal,
wherein the Doppler-shifting mechanism is operative to rotate the transmitter with respect to azimuth, wherein the Doppler-shifting mechanism is operative to vibrate the transmitter and; wherein the transmitter is operative such that the pulsed signal is timed to coincide with a peak in a vibration imparted to the transmitter.

2. The system of claim 1, wherein the Doppler-shifting mechanism comprises a concave reflector operative to reflect the transmitted pulse in the inertial plane of the concave reflector.

3. The system of claim 1, wherein the Doppler-shifting mechanism comprises a reflective rotating dish having an outer rim, the Doppler-shifting mechanism being operative to direct a pulsed signal from the transmitter to illuminate the outer rim such that the pulsed signal is transmitted in the inertial reference plane of the rotating dish.

4. The system of claim 1, wherein the transmitter is operative to maintain phase coherence between pulses.

5. A method of producing radar images, comprising:
transmitting a Doppler-shifted pulse;
receiving the Doppler-shifted pulse as a reflection from a target;
analyzing the pulse received to generate a plurality of samples; and
correlating frequency responses of the plurality of samples with points on the target, wherein correlating frequency responses further comprises:
sorting the plurality of samples into range bins based on times received;
determining the frequency responses of the plurality of samples within the range bins;
correlating a frequency response of a sample to an azimuthal coordinate, and the range bin of a sample to a radial coordinate; producing an image of the target using the coordinates determined for the plurality of samples,
wherein pulse is transmitted from a wide-beam antenna that illuminates the entire target;
wherein the target is terrain, wherein transmitting a Doppler-shifted pulse comprises imparting relative motion between the target and a transmitter used for transmitting the pulse, wherein imparting relative motion comprises vibrating the transmitter and,
further comprising timing transmission of the Doppler-shifted pulse to coincide with a peak in vibration of the transmitter.

6. The method of claim 5, wherein imparting relative motion comprises rotating the transmitter.

* * * * *